United States Patent Office 3,207,598
Patented Sept. 21, 1965

3,207,598
PROCESS FOR PREPARING CESIUM
AND ALLOYS THEREOF
Cornelius E. Berthold, Trona, Calif., assignor, by mesne assignments, to San Antonio Chemicals, Inc., a corporation of Delaware
No Drawing. Filed Aug. 1, 1962, Ser. No. 213,871
11 Claims. (Cl. 75—135)

This invention relates to novel methods for the preparation of certain alkali metals and in particular it relates to methods for preparing cesium by the reaction of cesium-bearing ores with sodium and/or potassium metal.

Considerable expense and difficulty has been encountered in the preparation of cesium from its ores. Heretofore, it has been considered impractical to prepare the cesium metal directly from its ores without first converting the cesium values in the ore to a pure cesium salt such as the chloride. Since the methods for the production of pure cesium salts from cesium ores are generally complex and expensive, this has added greatly to the cost and difficulty of producing cesium metal. Also, the reduction of cesium salts with various reducing agents generally requires very high temperatures, e.g. 900° C. and above, and high vacuums. The use of such elevated temperatures and vacuums has generally rendered the production of cesium metal both difficult and expensive.

It now has been discovered that relatively inexpensive cesium-bearing ores, for example, cesium silicate ores such as pollucite can be utilized to produce cesium metal without first preparing cesium salts from the ores and without the use of extremely high temperatures and high vacuums.

Broadly, this invention comprises admixing sodium and/or potassium metal with cesium-bearing ores and heating the mixture to between about 700° C. and 845° C. whereby a sodium-cesium, potassium-cesium or sodium-potassium-cesium vapor mixture is generated. The resulting cesium-containing vapor mixture is conveniently withdrawn from the reaction mixture, for example, by means of an inert gas sweep which carries the vapor mixture into a condensing zone. The metallic vapor is condensed by any convenient means, for example, by reducing the temperature of the gas-vapor stream, or by introducing the gas-vapor stream into a cool liquid medium such as mineral oil or by like means. The condensed cesium alloy can be separated, if desired, into cesium metal and/or sodium metal and potassium metal, for example, by distillation.

The cesium-bearing ores used in this invention, normally contain from a trace to about 3% by weight of other alkali metals such as rubidium, potassium, sodium and lithium. The presence of these alkali metals does not adversely affect the process of this invention. In order to insure complete reaction, the ores which are prepared for use according to this invention are advantageously reduced to a fine particulate state prior to introducing them into the reaction mixture. Reducing the ores to a fine particulate state is not, however, essential to the process.

Preferably, the cesium-bearing ores employed according to this invention are completely dehydrated prior to being introduced into the reaction zone. The water of hydration is removed so that it will not be released and react with the alkali metals which are present during the reaction. Dehydration can be accomplished, for example, by roasting the ore.

The sodium and/or potassium metal used in this invention is conveniently that which is commercially available as the solid metal. The metal need not be particularly pure since small amounts of impurities do not hinder the reactions to any material extent. Either sodium metal alone or potassium metal alone can be used. Various sodium-potassium mixtures can be used if desired. The preferred metal is sodium because the reaction proceeds smoothly with sodium and the cesium is easy to separate from sodium. Typical sodium-potassium mixtures include various sodium-potassium alloys and mechanical mixtures.

The metal can be admixed with the cesium-bearing ore in amounts ranging from about 0.25 part to about 10 parts of metal for each 1 part of ore. Ratios of metal to ore of between about 0.25 to 1 and about 1 to 1 are preferred with ratios of about 1 to 1 being the most preferred. The use of ratios higher than about 1 to 1 will result in the production of cesium alloys in which the sodium and/or potassium content is higher than is desired for optimum separation of the cesium from the other metals. As the proportion of other metals increases in the cesium alloy, the complexity and difficulty of separating cesium from the other metals in the alloy increases.

Sodium and/or potassium metal can be admixed with the cesium-bearing ore in any desired manner. Thus, it can, be chopped into small pieces and admixed with the ore, or it can be contacted with the ore in its liquid or vapor state. Molten metal can, for example, be injected into a mass of ore and admixed therewith. Alternatively, a fluidized bed process can be used. In a typical fluidized bed operation, a bed of finely divided cesium-bearing ore is fluidized with argon carrying sodium and/or potassium vapor.

After the sodium and/or potassium metal has been utilized in this invention, it is present as a cesium alloy. The sodium and/or potassium can be separated, for example, by fractional distillation and recycled to be used in the extraction of more cesium. It is not absolutely essential to extract all of the cesium from the other metals since the presence of a small amount of cesium in the recycled metal will not effect the use of the metal to extract more cesium from its ores.

The process of this invention is particularly valuable because it is unnecessary to utilize any additional reducing agent to break down the ore so that the sodium and/or potassium can extract the cesium values therefrom. The advantages of using a single reagent which extracts the cesium metal directly from its ores are multiple. When using a single reagent in this process, it is unnecessary to maintain plural reagent inventories within the reactor and it is unnecessary to provide for the supply and removal of additional reagents.

Sodium is particularly desirable as a cesium extractant because it is highly efficient. Substantially, all of the cesium values present in the cesium-bearing ores are readily and simply extracted by contacting the ore with sodium according to this invention.

In the specification, appended claims and following examples, all parts and percentages are by weight unless otherwise indicated. The following examples are submitted to illustrate and not to limit the invention.

*Example I*

A mixture of 300 parts of roasted −200 mesh pollucite ore is mixed with 300 parts of lump (½" to 1" pieces) sodium metal in a steel reactor vessel. The pollucite ore is analyzed before roasting and found to contain: 20.3% of $Cs_2O$; 0.74% of $Rb_2O$; 1.08% of $K_2O$; 2.22% of $Na_2O$ and 0.75% of $Li_2O$.

The reactor vessel is fitted with an exit tube terminating in a mineral oil bath. This tube serves to collect and convey the metal vapors from the reactor to the mineral oil bath wherein the vapors are condensed. The top cover of the reaction vessel is fitted with a thermowell and a helium sweep gas inlet. The reaction vessel is sealed and nitrogen gas is introduced to sweep air and other gases from the reactor. Purified helium gas is then swept through the reactor for about an hour. After sweeping the reactor with helium gas, the reactor is slowly heated over a period of about 3.5 hours from ambient temperature to a temperature of about 750° C. heating is accomplished by means of an external heating mantle. At about 750° C., a rapid reaction takes place and cesium-sodium vapor begins to pass through the exit tube and collect in the mineral oil condenser. The temperature is maintained at about 750° C. for about 0.5 hour. The reactor is then cooled while maintaining the helium sweep through it. The reactor is filled with mineral oil prior to opening. A sample of the residue remaining in the reactor is found to contain 0.67% $Cs_2O$. The alloy which collects in the mineral oil condenser is found to contain 39.8% cesium, 58.8% sodium and 1.4% total of rubidium plus potassium.

*Example II*

The procedures of Example I are repeated except that 300 parts of ore are used with 75 parts of sodium. More than 50% of the cesium present in the initial ore is extracted in this manner.

*Example III*

The procedures of Example I are repeated except that 300 parts of ore are used with 2800 parts of sodium. Only trace amounts of cesium remain in the reaction vessel. However, an extensive distillation step is required to separate the small amount of cesium from the large amount of sodium which is collected in the mineral oil condenser.

*Example IV*

A bed of roasted −200 mesh pollucite ore is placed on a porous steel support in a steel reaction vessel. The pollucite ore has the same analysis as that described in Example I above.

The reaction vessel is fitted with an exit tube terminating in a mineral oil bath. This tube serves to collect and convey the metal vapors from the reactor to a mineral oil bath wherein the vapors are condensed. The bottom of the reactor below the porous support is fitted with a gas inlet tube. Heated argon and potassium vapor are introduced through the bottom gas inlet and contacted with the pollucite ore in a fluidized bed operation. A rapid reaction takes place at about 790° C. and cesium-potassium alloy begins to appear in the stream passing through the exit tube. The process is continued for about 1 hour. Less than 1% of the $Cs_2O$ present in the original ore remains in the residue in the reactor.

The use of of sodium in the process of this invention permits the use of relatively low reaction temperatures because sodium has a high vapor pressure and low melting point. This is a very important advantage because at the temperatures at which this process is operated, even a reduction of a few degrees centigrade prolongs the life of the equipment considerably. As indicated above, this process can be operated over a temperature range of about 650° C. to about 845° C. However, it is preferred to operate this process between about 725° C. and about 800° C. The preferred temperature, according to this invention, is the minimum temperature at which cesium alloy vapor is evolved from the reaction mixture in appreciable amounts. The minimum temperature at which an efficient rate of reaction can be obtained is the most desirable reaction temperature. As the reaction temperature is lowered, less elaborate reaction equipment is required to contain the reaction and the life of all the equipment which is in contact with the reaction mixture is extended. This temperature is generally about 750° C.

The high vapor pressure and low melting point of sodium and potassium, which permit the use of relatively low reaction temperatures, also permit the use of an inert gas sweep rather than a vacuum to remove the reaction products from the reaction zone. This is so because the desired alloy is evolved as a vapor at an efficient rate without the aid of a vacuum. The use of an inert gas sweep rather than a vacuum, greatly simplifies the procedures and the equipment used in this invention. It is very difficult to seal a reaction vessel so that it will hold a vacuum when operating at the temperatures employed in this invention. An inert gas sweep can be introduced at any rate desired so that air and other undesired gases are excluded from the reaction vessel by the positive pressure of the inert gas sweep. The gas sweep serves not only to exclude undesired gases from the reaction zone but also to carry the cesium alloy vapor away from the reaction zone to a place where it can be condensed. The inert gas sweep can be recycled and replenished from any appropriate source as is desired.

The use of of sodium in this process is particularly advantageous from the standpoint of separating the cesium-sodium reaction product into its component metals. The boiling points of sodium and cesium are widely separated which makes the separation of the metals from one another, by distillation, very easy.

It is possible to tolerate a certain amount of impurities in the process without substantially decreasing the efficiency of the process. In this respect, sodium is a particularly desirable reactant because it does not form highly corrosive materials when contacted, for example, with air. This is in sharp contrast to lithium, for example, which forms a highly corrosive lithium nitride when contacted with air.

The process of this invention can be carried out in any appropriate equipment setup such as, for example, batch, continuous, semi-continuous and the like, equipment arrangements.

As will be understood by those skilled in the art, what has been described is the preferred embodiment of the invention; however, many modifications, changes and substitutions can be made therein without departing from the scope and the spirit of the following claims.

What is claimed is:

1. Process for separating cesium values from cesium ores comprising; admixing cesium-bearing ore and a metal selected from the group consisting of elemental sodium, potassium and mixtures thereof, to produce a mechanical mixture of said ore and said metal, maintaining such mechanical mixture at such a temperature that a vapor mixture of cesium and said metal is expelled from said mechanical mixture, condensing said vapor mixture to produce an alloy of cesium and said metal.

2. Process for separating cesium values from cesium ores comprising; admixing cesium-bearing silicate ore and a metal selected from the group consisting of liquid elemental sodium, potassium and mixtures thereof, to produce a mechanical mixture of said ore and said metal, maintaining said mechanical mixture at a temperature of from about 650° C. to about 845° C. whereby a vapor mixture of cesium and said metal is expelled from said mechanical mixture, and condensing said vapor mixture to produce an alloy of cesium and said metal.

3. Process for separating cesium values from cesium ores comprising; admixing cesium-bearing silicate ore and a metal selected from the group consisting of vaporous elemental sodium, potassium and mixtures thereof, to produce a mechanical mixture of said ore and said metal, maintaining said mechanical mixture at a temperature of from about 650° C. to about 845° C. whereby a vapor mixture of cesium and said metal is expelled from said mechanical mixture, and condensing said vapor mixture to produce an alloy of cesium and said metal.

4. Process for separating cesium values from cesium ores comprising; admixing cesium-bearing silicate ore and a metal selected from the group consisting of elemental sodium, potassium and mixtures thereof, to produce a mechanical mixture of said ore and said metal, maintaining said mechanical mixture at a temperature of from about 650° C. to about 845° C. whereby a vapor mixture of cesium and said metal is expelled from said mechanical mixture, and condensing said vapor mixture to produce an alloy of cesium and said metal by contacting said vapor mixture with a cool surface.

5. Process for separating cesium values from cesium ores comprising; admixing cesium-bearing silicate ore and a metal selected from the group consisting of elemental sodium, potassium and mixtures thereof, to produce a mechanical mixture of said ore and said metal, maintaining said mechanical mixture at a temperature of from about 650° C. to about 845° C. whereby a vapor mixture of cesium and said metal is expelled from said mechanical mixture, and condensing said vapor mixture to produce an alloy of cesium and said metal by introducing said vapor mixture into a liquid bath.

6. Process for separating cesium values from cesium ores comprising; admixing cesium-bearing silicate ore and a metal selected from the group consisting of elemental sodium, potassium and mixtures thereof, to produce a mechanical mixture of said ore and said metal, maintaining said mechanical mixture at a temperature of from about 650° C. to about 845° C. whereby a vapor mixture of cesium and said metal is expelled from said mechanical mixture, condensing said vapor mixture to produce an alloy of cesium and said metal, and separating said cesium from said alloy.

7. Process for separating cesium values from cesium ores comprising; admixing cesium-bearing silicate ore and a metal selected from the group consisting of elemental sodium, potassium and mixtures thereof, to produce a mechanical mixture of said ore and said metal, maintaining said mechanical mixture at a temperature of from about 725° C. to about 845° C. whereby a vapor mixture of cesium and said metal is expelled from said mechanical mixture, maintaining an inert gas atmosphere over said mixture, conducting said vapor mixture away from said mechanical mixture by means of said inert gas, and condensing said vapor mixture to produce an alloy of cesium and said metal.

8. Process for separating cesium values from cesium ores comprising; admixing from about one part of cesium-bearing silicate ore to 0.25 to about 10 parts of a metal selected from the group consisting of elemental sodium, potassium and mixtures thereof, to produce a mechanical mixture of said ore and said metal, maintaining said mechanical mixture at a temperature that a cesium alloy vapor mixture of cesium and said metal is expelled from said mechanical mixture, and condensing said vapor mixture to produce an alloy of cesium and said metal.

9. Process for separating cesium values from cesium ores comprising; admixing cesium-bearing silicate ore and a metal selected from the group consisting of elemental sodium, potassium and mixtures thereof, to produce a mechanical mixture of said ore and said metal, maintaining said mechanical mixture at a temperature of from about 650° C. to about 845° C. whereby a vapor mixture of cesium and said metal is expelled from said mechanical mixture, and condensing said vapor mixture to produce an alloy of cesium and said metal.

10. Process for separating cesium values from cesium ores comprising; admixing cesium-bearing silicate ore and a metal selected from the group consisting of solid elemental sodium, potassium and mixtures thereof, to produce a mechanical mixture of said ore and said metal, heating said mechanical mixture to a temperature of from about 725° C. to about 845° C. whereby a vapor mixture of cesium and said metal is expelled from said mechanical mixture, and condensing said vapor mixture to produce an alloy of cesium and said metal.

11. Process for separating cesium values from pollucite ores comprising; admixing pollucite ore and a metal selected from the group consisting of elemental sodium, potassium and mixtures thereof, to produce a mechanical mixture of said ore and said metal, maintaining said mechanical mixture at a temperature of from about 725° C. to about 845° C. whereby a vapor mixture of cesium and said metal is expelled from said mechanical mixture, and condensing said vapor mixture to produce an alloy of cesium and said metal.

References Cited by the Examiner
FOREIGN PATENTS 590,274  7/47  Great Britain.

OTHER REFERENCES

Rare Metals Handbook, 2nd edition, C. A. Hampel, Reinhold Pub. Corp., London, 1961, pages 434–440.

Hackspill et al.: "Direct Preparation of Metallic Cesium From Swedish Pollucite," Acadamie des Sciences Comptes Rendus, vol. 230, January–March 1950, pages 1119–1121.

Metals Reference Book, 2nd ed., C. J. Smithells, Interscience Publishers, N.Y., 1955, vol. 1, page 249.

DAVID L. RECK, *Primary Examiner.*

WINSTON A. DOUGLAS, HYLAND BIZOT,
*Examiners.*